United States Patent [19]
Birioukov et al.

[11] Patent Number: 5,484,339
[45] Date of Patent: Jan. 16, 1996

[54] ARTICULATED COUPLING

[75] Inventors: Ivan W. Birioukov; Hasan G. Usmanov, both of Moskow, Russian Federation

[73] Assignee: Hackforth GmbH & Co. KG, Herne, Germany

[21] Appl. No.: 149,192

[22] Filed: Nov. 5, 1993

[30] Foreign Application Priority Data

Nov. 5, 1992 [DE] Germany ............ 42 37 327.1

[51] Int. Cl.⁶ ............................................. F16D 3/62
[52] U.S. Cl. .................. 464/69; 464/138; 464/147
[58] Field of Search ................. 464/69, 147, 71, 464/138, 137

[56] References Cited

U.S. PATENT DOCUMENTS

| | | | |
|---|---|---|---|
| 3,481,158 | 12/1969 | Mayerjak | 464/69 |
| 4,118,952 | 10/1978 | Kobayashi | 464/69 |
| 4,515,573 | 5/1985 | Eichinger | 464/71 |
| 4,804,352 | 2/1989 | Schmidt | 464/69 |

FOREIGN PATENT DOCUMENTS 3049054  7/1982  Germany.
1210204  10/1970  United Kingdom.

*Primary Examiner*—Daniel P. Stodola
*Assistant Examiner*—Eileen A. Dunn
*Attorney, Agent, or Firm*—Robert W. Becker & Associates

[57] ABSTRACT

An articulated coupling, especially for rail vehicles, for transmitting the engine power from a hollow input shaft mounted on the vehicle frame, to an output shaft of limited movement surrounded by the hollow shaft has a first flange rigidly connected to the hollow shaft and a second flange rigidly connected to the output shaft. Two pairs of links connect the flanges. An overhung intermediate member surrounds the output shaft, with the links being supported on the intermediate member. To obtain optimum central symmetry; the two flanges are aligned, all the links are of equal length and so positioned relatively to one another that the projections of the articulation points in a plane extending perpendicularly to the output shaft form the corners of a square. The two opposite links on the intermediate member are pivotally supported at their center. These two links form an obtuse angle facing in the direction of the output shaft. The articulation points of the intermediate member lie on a circular line extending through the corners of the square. Rubber-metal joints are used at all pivotal joints so that the joints are of limited elasticity and can thus absorb angular shifts.

7 Claims, 5 Drawing Sheets

ARTICULATED COUPLING

BACKGROUND OF THE INVENTION

The present invention relates to an articulated coupling, especially for rail vehicles, for coupling rotating parts which are movable to a limited extent radially and/or angularly relatively to one another.

Articulated couplings of this type are known in various constructions, e.g. from DE-A-30 49 054. In these couplings, a first flange on the input side is connected to a second flange on the output side via first pair of links and a second pair of links. An intermediate member is also provided as a support. It has an opening that surrounds the input shaft with clearance and pivotally interconnects the two pairs of links.

The main factors governing the life of such couplings are angular shifts of the coupling elements relatively to one another, kinematic errors, i.e., the variation in the transmission coefficient during one revolution, which coefficient causes excitation of forced oscillations of the propulsion system, and coupling imbalances. Under the expected operating conditions, the angular shifts of the links and the imbalance forces occurring should be as low as possible, while, on the other hand, radial shiftability should be adequately ensured.

It is therefore an object of the present invention to provide an improved articulated coupling which is based on the advantages of the known articulated couplings, but which does not exhibit the known disadvantages or only to a reduced degree, in order to thus prolong the service life under the expected shift conditions.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

Figure 1:
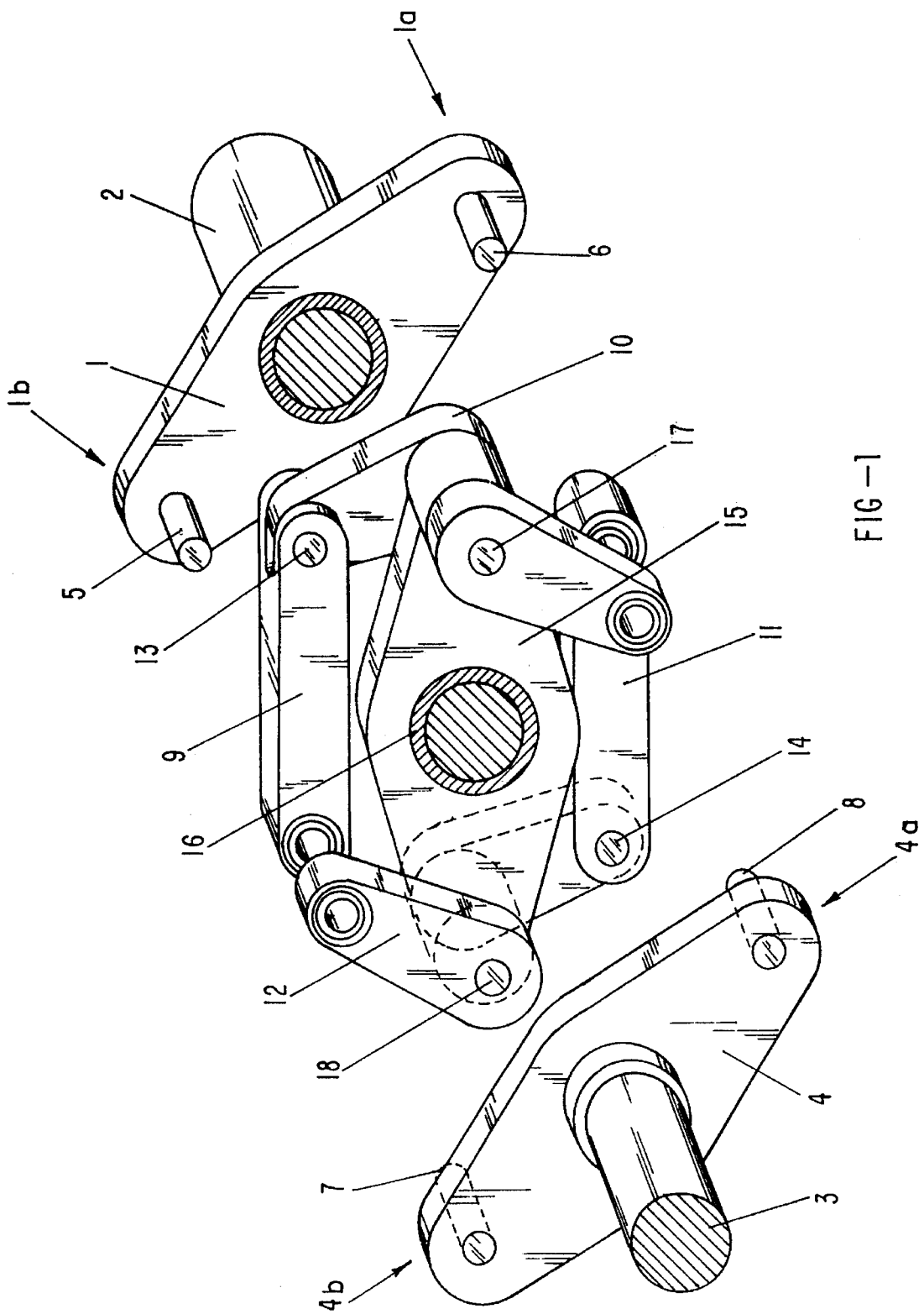
FIG. 1 is a perspective, exploded view of the articulated coupling showing various individual parts.

The articulated coupling for transmitting engine power from a hollow input shaft to an output shaft according to the present invention is primarily characterized by:

A hollow input shaft;

A first flange fixedly connected to the input shaft, the first flange having a first and a second free end;

An output shaft;

A second flange fixedly connected to the output shaft, the second flange having a first and a second free and being positioned on the output shaft so that the first end of the first flange is aligned with the first end of the second flange and the second end of the first flange is aligned with the second end of the second flange;

A first pair of links connecting the first end of the first flange to the second end of the second flange;

A second pair of links connecting the second end of the first flange to the first end of the second flange;

An intermediate member positioned overhung on the hollow shaft;

The first and the second pairs of links pivotably supported at the intermediate member;

The links of the first and the second pairs of links having an identical effective length;

The links of each pair of links pivotably connected to one another;

Wherein a projection of the articulation points of the two pairs of links onto a plain positioned perpendicular to the output shaft forms corners of a square;

Wherein one link of the first pair of links and one link of the second pair of links are positioned diametrically opposite one another with respect to the intermediate member and are connected with a center portion thereof to the intermediate member;

Wherein each said one link of the first and the second pairs of links have two arms connected to the center portion, the two arms positioned on opposite end faces of the intermediate member;

Preferably, the two arms of the one link of the first and the second pairs of links form an obtuse angle relative to one another, the obtuse angle facing the output shaft, and a jointing center of the two arms is positioned on an imaginary circle extending through the corners of the square.

Expediently, the articulated coupling further comprises rubber metal joints for connecting the links to the flanges, wherein the first and the second flanges have pivot pins fixedly connected thereto and extending parallel to the output shaft, and wherein the links are connected with the rubber metal joints to the pivot pins.

Advantageously, each said one link of the first and the second pairs of links is comprised of two halves, representing the two arms, the two halves fixedly connected to one another by a bolt, wherein the bolt simultaneously serves as a pivot bearing.

In a preferred embodiment of the present invention, the articulated coupling further comprises a spherical rubber metal joint for supporting the bolt at the intermediate member.

Advantageously, the one link of the first and the second pairs of links comprises a bearing bushing, the link and the bearing bushing forming a unitary part. The intermediate member preferably has two fork-shaped ends with a bearing pin, to which the bearing bushings of the one link of the first and the second pairs of links are connected.

Preferably, the bearing bushings comprise a rubber metal joint for connecting the one link of the first and the second pairs of links to the bearing pins.

According to the present invention, the solution to the object is defined by the following features:

a) the two flanges are aligned with one another, b) all the links have the same effective length, c) the links of a pair are pivotally interconnected for rotation at their inner ends, d) the projections of the points of articulation of the two parts of links in a plane perpendicular to the output shaft form the corner points of a square, e) support at the intermediate member for the two opposite links is in each case provided at their center portion, and f) the arms of the links articulated on the intermediate member extend on axially opposite sides, or the longitudinal central plane, of the intermediate member.

Thus, according to a first advantageous development, the links articulated on the intermediate member are bent at an obtuse angle facing in the direction of the output shaft in such manner that the two articulation axes at the intermediate member lie on a circular line extending through the corners of the square.

For securing the links at the flanges, pivot pins extending parallel to the output shaft are rigidly secured thereon, the links being connected to the pivot pins by rubber-metal joints known per se.

According to a first aspect of the invention, the links articulated on the intermediate member each are comprised of two halves, and the two halves are rigidly interconnected by a bolt which simultaneously serves as a pivotal bearing.

The bolts are each mounted on the intermediate member by means of a spherical rubber-metal joint.

According to another aspect of the invention, the links articulated on the intermediate member are each constructed as one-piece links with a unitary bearing bushing formed thereon, and the intermediate member has at each of its ends a fork with a bearing pin each receiving a bearing bushing of the links.

The bearing bushings are each mounted on the bearing pin by means of a rubber-metal joint.

In the novel articulated coupling, the center points of all the articulations are positioned on a common circular arc to obtain the maximum central symmetry.

Also, all the links are of equal length. The links articulated on the intermediate member are so devised that they are situated on opposite sides (end faces) of the intermediate member. This results in an extremely compact construction. Rubber-metal joints known per se can be used for all the articulations, so that the articulations are of limited elasticity. As a result of this construction, in the novel articulated coupling optimum kinematic and dynamic conditions are obtainable for the pivotal elements, which determine the life of the coupling and the reliability of the complete arrangement.

DESCRIPTION OF PREFERRED EMBODIMENTS

In FIG. 1, the input flange 1 on the input side of the articulated coupling is connected for rotation to a hollow shaft 2 mounted within the vehicle chassis (not shown) and connected to the propulsion motor. The output shaft 3 extends inside the hollow input shaft 2 and the driven flange 4 is fixedly connected for rotation to shaft 3. Shaft 3 is radially and/or angularly movable with respect to the driving hollow input shaft 2. In the illustrated exemplary embodiment, the aligned flanges 1, 4 have a rhomboidal contour. Of course, they may also be of a different shape, e.g. circular.

Pairs of aligned pivot pins 5, 6 and 7, 8, respectively, are mounted to the free ends 1a, 1b, 4a, 4b of the flanges 1, 4 on their inwardly facing sides. The pivot pins 5, 8 are interconnected by a first pair of links, i.e., the links 9, 10, and the pivot pins 6, 7 are interconnected by a second pair of links, i.e. the links 11, 12. The articulations on the pivot pins are constructed as rubber-metal joints. They consist basically of two concentric sleeves and a rubber ring in the gap between the two sleeves. The rubber ring may be vulcanized to the walls of the sleeves. Rubber-metal joints of this kind are known in the art. They allow limited angular movements of the connected links relatively to the pivot pins.

In the exemplary embodiment, the links 9, 11 extending from the input flange 1 are formed in each case of two congruent plates. At their free end, the plates enclose the articulated link 10 or 12, respectively. The articulation is provided by bolts 13 and 14, respectively.

An intermediate member 15 having a central bore 16 is used to support the two pairs of links 9, 10 and 11, 12, respectively, as well as the output shaft 3 or, if required, the free end of the hollow shaft 2 extending with clearance inside the bore 16. At each of its opposite ends, the intermediate member 15 has an axis-parallel bore for the pivotal mounting of pivots (bolts) 17 and 18, respectively. At the free ends of each pivot 17 and 18 one half of each of the two-part links 10 and 12, respectively, is secured so as to be non-rotatable. Unlike the links 9, 11, the links 10, 12 are not rectilinear, but are bent at an obtuse angle. Also, the respective halves of the links 10, 12 extend on opposite sides of the intermediate member 15.

Figure 5:
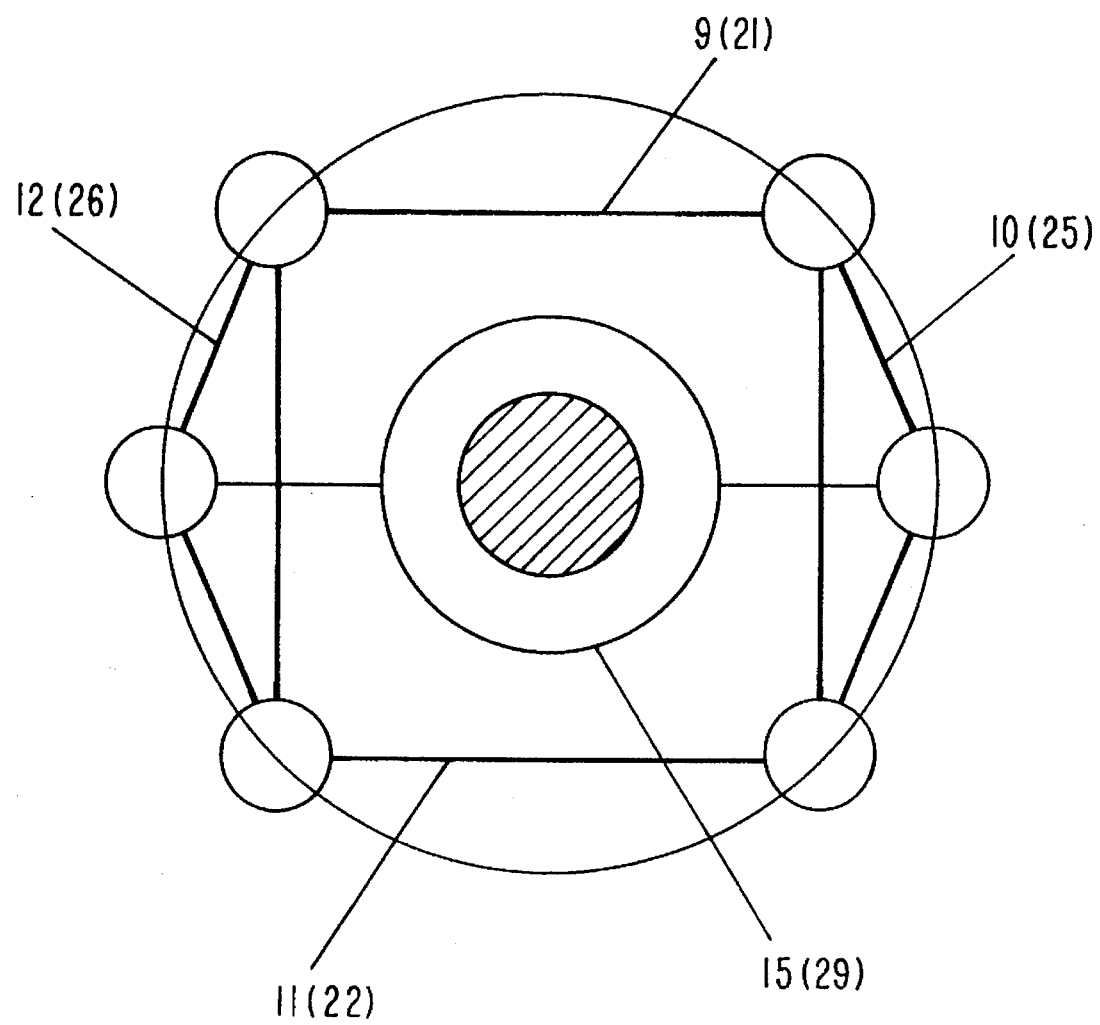
FIG. 5 is a diagram of the articulated coupling, its points of articulation positioned on a single circular line.

To obtain the maximum possible central symmetry, the distances between the articulation points are the same for all the links. This allows to arrange the links such that in the rest position of the articulated coupling the projections of the four articulation points lie on a common circular line as shown in FIG. 5. Also, in the case of the links 10, 12, the halves are in each case so bent relative to one another that the centers of the bolts (pivots) 17, 18 also coincide with the circular line. The reference numerals of FIG. 1 are used for the links and the intermediate member in the diagram of FIG. 5.

A mounting providing limited angular movement is also provided for the bolts (pivots) 17, 18 on the intermediate member 15. To this end, a spherical rubber-metal joint 19 known per se is provided in each case inside the bore 20 of the intermediate member 15.

Figure 2:
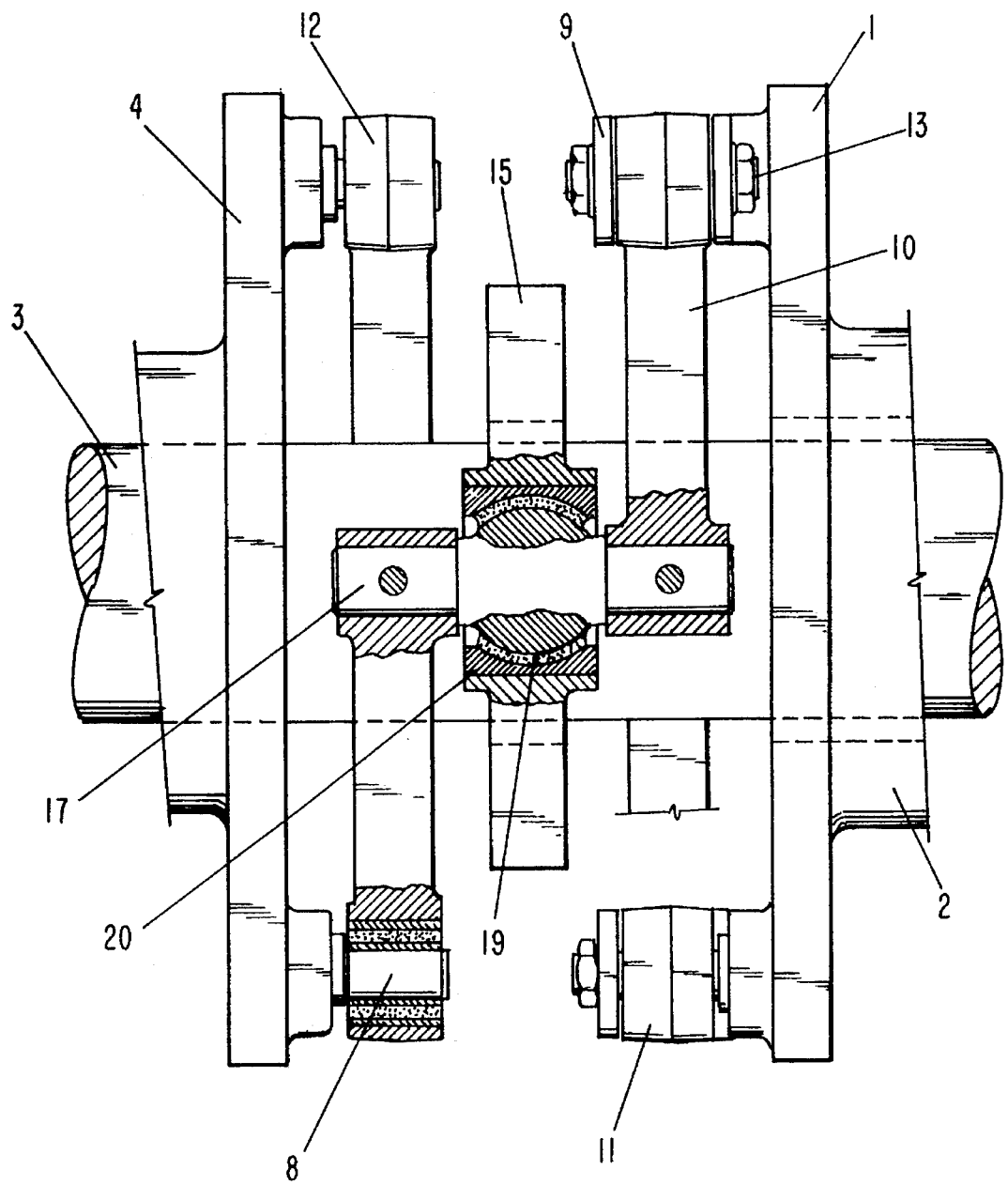
FIG. 2 is a side elevation of the articulated coupling of FIG. 1 with details shown in section.
Figure 3:
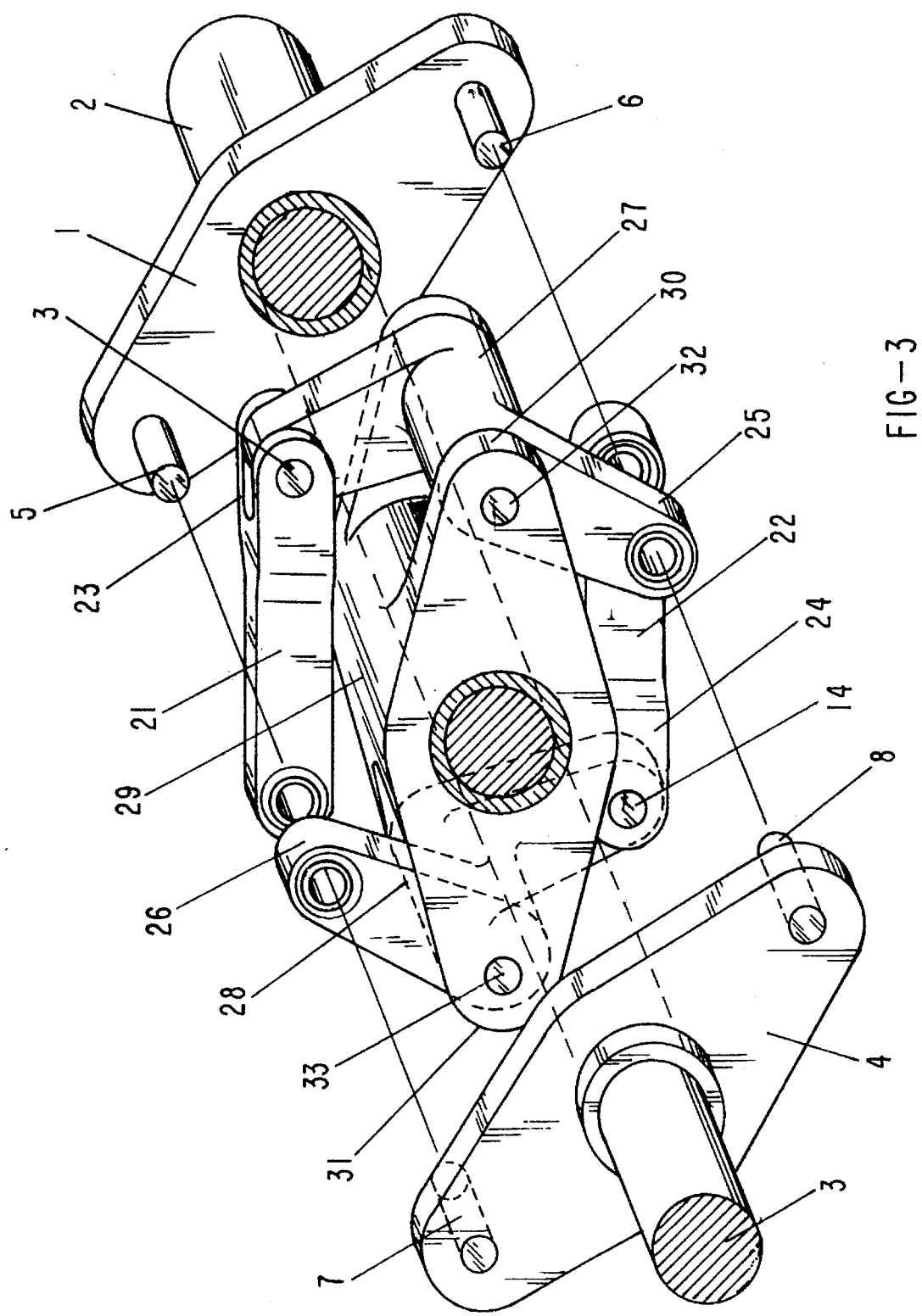
FIG. 3 is another perspective view of an articulated coupling of a modified embodiment.
Figure 4:
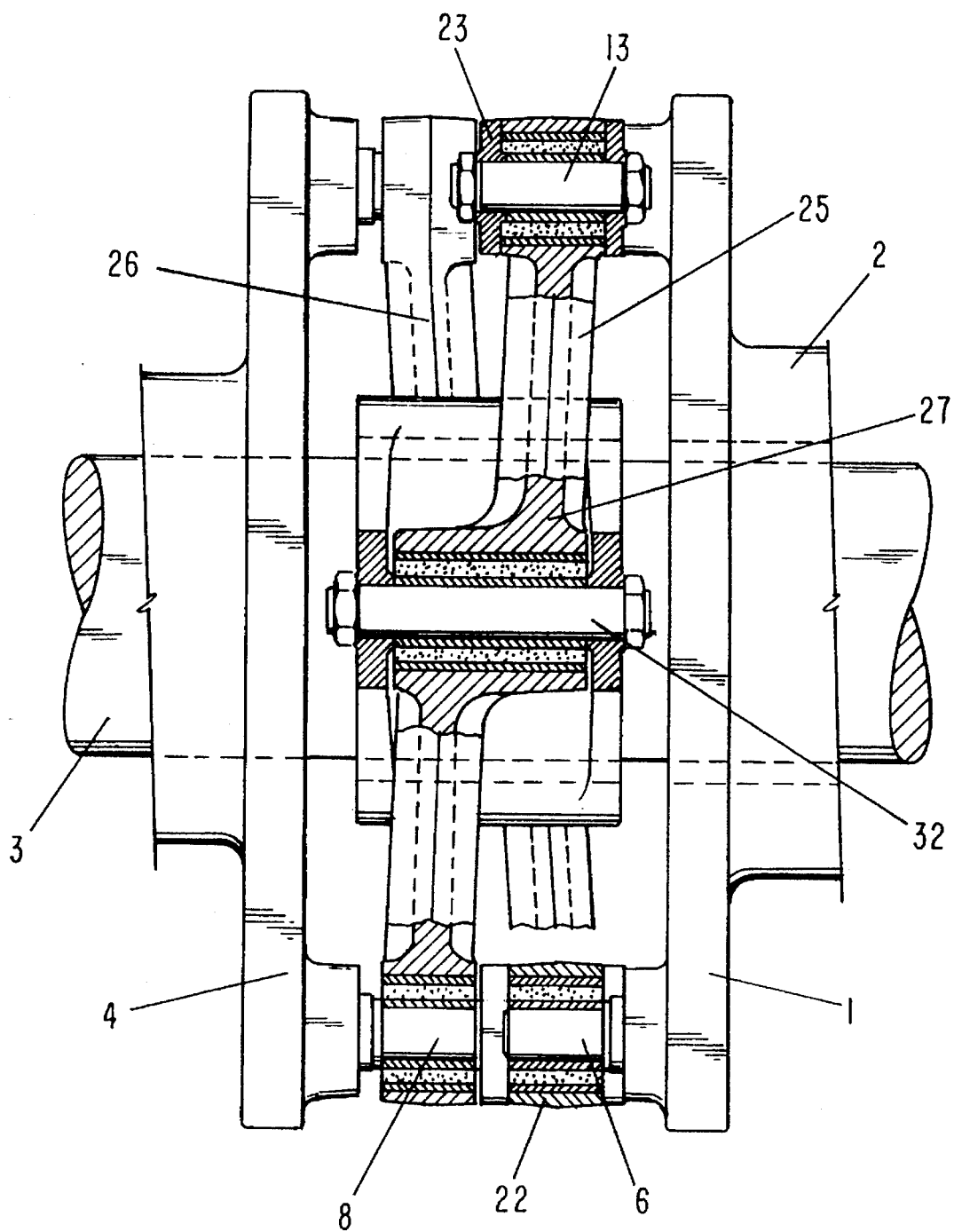
FIG. 4 is a side elevation of the embodiment shown in FIG. 3 with details shown in section.

The modified embodiment shown in FIGS. 3 and 4 corresponds in function to the above-described embodiment of the articulated coupling. Only a few individual components are of a different design. The reference numerals of FIGS. 1 and 2 are retained for like parts.

Firstly, the links 21 and 22 articulated on the input flange 1 have in each case a fork 23 and 24, respectively, integrally formed at their free end. The links 25 and 26, respectively, are in each case connected to the fork by means of a bolt 13 and 14. Each of these links 25 and 26 is constructed as a one-piece link with a bushing 27 and 28, respectively, formed at the center portion. The arms of the links 25 and 26, respectively, are bent towards the center at an obtuse angle as in the first embodiment. The arms also extend in offset planes in the axial direction, as shown in FIGS. 3 and 4.

In this embodiment the intermediate member 29 is formed with two fork-shaped ends 30, 31. The bearing bushings 27 and 28, respectively, of the links 25, 26 are mounted for rotary movement on a bearing pin 32, 33 provided at each fork-shaped (forked) end. As in the first embodiment, here again all the joints are in the form of rubber-metal joints.

In the second embodiment there is also a square arrangement of the four articulation points as shown in FIG. 5. The articulation points of the bearing pins of the intermediate member 29 are also located on the common circle.

The articulated coupling according to the present invention operates as follows:

For simplification purposes, only the embodiment of FIGS. 1 and 2 is used in the following description.

The torque is transmitted from the input flange 1 to the links 9, 11 and the respective articulated links 10, 12 to the output flange 4 and hence to the output shaft 3. The overhung intermediate member 15 acts as a support by preventing the links 9, 10 and 11, 12, respectively, from approaching one another or from moving apart. The resulting articulated quadrilateral (square) with the elastic joints at the individual articulation points allows vertical and horizontal shifting of the output shaft 3 relative to the hollow shaft 2 mounted within the chassis. The arrangement selected for the individual elements guarantees equal and maximum lengths of the links for a coupling diameter governed by external installation conditions. As a result, the angles and relative shifts of the links are less than in known types of construction. A reduction of the relative shift angle increases the life of the joints; reduction of the kinematic error reduces the dynamic moments.

The present invention is, of course, in no way restricted to the specific disclosure of the specification and drawings, but also encompasses any modifications within the scope of the appended claims.

What we claim is:

1. An articulated coupling for transmitting engine power from a hollow input shaft to an output shaft; said coupling comprising:

a hollow input shaft;

a first flange fixedly connected to said input shaft, said first flange having a first and a second free end;

an output shaft;

a second flange fixedly connected to said output shaft, said second flange having a first and a second free end being positioned on said output shaft so that said first end of said first flange is aligned with said first end of said second flange and said second end of said first flange is aligned with said second end of said second flange;

a first pair of links connecting said first end of said first flange to said second end of said second flange;

a second pair of links connecting said second end of said first flange to said first end of said second flange;

an intermediate member positioned overhung on said hollow shaft;

said first and said second pairs of links pivotably supported at said intermediate member;

all of said links of said first and said second pairs of links having an identical effective length;

said links of each said pairs of links pivotably connected to one another;

wherein a projection of articulation points of said two pairs of links onto a plane positioned perpendicular to said output shaft forms corners of a square;

wherein one said link of said first pair of links and one said link of said second pair of links are positioned diametrically opposite one another with respect to said intermediate member and are pivotably connected with a center portion thereof to said intermediate member; and wherein each said one link of said first and said second pairs of links have two arms connected to said center portion, said two arms positioned on opposite end faces of said intermediate member.

2. An articulate coupling according to claim 1, wherein said two arms of said one link of said first and said second pairs of links form an obtuse angle relative to one another, said obtuse angle facing said output shaft, and wherein a jointing center of said two arms is positioned on an imaginary circle extending through said corners of said square.

3. An articulated coupling according to claim 1, further comprising rubber metal joints for connecting said links to said flanges, wherein said first and said second flanges have pivot pins fixedly connected thereto and extending parallel to said output shaft, and wherein said links are connected with said rubber metal joints to said pivot pins.

4. An articulated coupling according to claim 1, wherein each said one link of said first and said second pairs of links is comprised of two halves, representing said two arms, said two halves fixedly connected to one another by a bolt, wherein said bolt simultaneously serves as a pivot bearing.

5. An articulated coupling according to claim 4, further comprising a spherical rubber metal joint for supporting said bolt at said intermediate member.

6. An articulated coupling according to claim 1, wherein said one link of said first and said second pairs of links comprises a bearing bushing, said one link and said bearing bushing forming a unitary part, and wherein said intermediate member has two forked ends with a bearing pin to which said bearing bushings of said one link of said first and said second pairs of links are connected.

7. An articulated coupling according to claim 6, wherein said bearing bushings comprise a rubber metal joint for connecting said one link of said first and said second pairs of links to said bearing pins.

* * * * *